United States Patent
Aoki

(10) Patent No.: US 10,017,137 B2
(45) Date of Patent: Jul. 10, 2018

(54) VEHICLE-MOUNTED SYSTEM AND WIRE HARNESS

(71) Applicant: Yazaki Corporation, Tokyo (JP)

(72) Inventor: Yoshihito Aoki, Susono (JP)

(73) Assignee: Yazaki Corporation, Tokyo (JP)

( * ) Notice: Subject to any disclaimer, the term of this patent is extended or adjusted under 35 U.S.C. 154(b) by 278 days.

(21) Appl. No.: 15/044,145

(22) Filed: Feb. 16, 2016

(65) Prior Publication Data

US 2016/0159297 A1 Jun. 9, 2016

Related U.S. Application Data

(63) Continuation of application No. PCT/JP2014/074650, filed on Sep. 18, 2014.

(30) Foreign Application Priority Data

Sep. 18, 2013 (JP) .................. 2013-192692

(51) Int. Cl.
*B60R 16/03* (2006.01)
*B60R 16/033* (2006.01)
*B60R 16/02* (2006.01)
*H02J 1/10* (2006.01)

(52) U.S. Cl.
CPC .......... *B60R 16/03* (2013.01); *B60R 16/0207* (2013.01); *B60R 16/033* (2013.01); *H02J 1/108* (2013.01)

(58) Field of Classification Search
CPC .................................................. B60R 16/03
USPC ........................................................ 307/10.1
See application file for complete search history.

(56) References Cited

U.S. PATENT DOCUMENTS

2005/0035656 A1  2/2005  Kuramochi et al.
2006/0076833 A1*  4/2006  Kojima ................. B60L 3/0007
                                                                307/10.1

FOREIGN PATENT DOCUMENTS

| JP | 60-131985 U | 9/1985 |
| JP | 02-040876 A | 2/1990 |
| JP | 02-040876 A | 2/1990 |
| JP | 03-116581 U | 12/1991 |

(Continued)

OTHER PUBLICATIONS

Office Action dated Jun. 27, 2017, issued for the Japanese patent application No. 2013-192692 and English translation thereof.

(Continued)

*Primary Examiner* — Joseph Chang
(74) *Attorney, Agent, or Firm* — Locke Lord LLP

(57) ABSTRACT

A seat control system includes: a motor unit mounted on a vehicle; a switch unit; a control ECU for controlling these units; a power source box for supplying a power source to the units; a main power source line connected between the units and the control ECU and provided for supplying a power source from a power source box; and a signal line connected between the units and the control ECU. The seat control system further includes: another power source box separate from a power source box for supplying a power source to the units; and a redundant power source line connected between the power source box and the units and provided for supplying a power source from the power source box. The redundant power source line is not connected to the control ECU.

4 Claims, 3 Drawing Sheets

(56) References Cited

FOREIGN PATENT DOCUMENTS

| | | |
|---|---|---|
| JP | 2000-236626 A | 8/2000 |
| JP | 2002-252933 A | 9/2002 |

OTHER PUBLICATIONS

International Search Report dated Nov. 11, 2014, issued for PCT/JP2014/074650.
Office Action dated Dec. 30, 2016, issued for the Chinese patent application No. 201480046732.2 and English translation thereof.

\* cited by examiner

140
VEHICLE-MOUNTED SYSTEM AND WIRE HARNESS

TECHNICAL FIELD

The present invention relates to a vehicle-mounted system and a wire harness structural body, and more particularly to a vehicle-mounted system for controlling electronic devices disposed in a vehicle and a wire harness structural body used in the vehicle-mounted system.

BACKGROUND ART

A large number of electronic devices are mounted in a vehicle. In connecting these electronic devices and a control ECU which performs a control of these electronic devices respectively, there exists a drawback that a weight of a wire harness is increased. To cope with such a drawback, there has been proposed a vehicle-mounted system where a plurality of electronic devices are divided into a plurality of electronic units, one power source line and one signal line pulled out from the control ECU are connected to the plurality of electronic units in a branched manner, and a function of communicating with the control ECU is imparted to connection connectors connected between the power source line and signal line with the electronic units.

However, in the above-mentioned vehicle-mounted system, there exists a drawback that all electronic devices cannot be driven when an abnormality occurs in the power source line.

SUMMARY OF INVENTION

Technical Problem

Accordingly, it is an object of the present invention to provide a vehicle-mounted system which can drive electronic devices even when an abnormality occurs in a power source line, and a wire harness structural body used in the vehicle-mounted system.

Solution to Problem

The invention according to a first aspect in order to solve the above-described issue is a vehicle-mounted system including: an electronic unit formed of one or more electronic devices mounted on a vehicle; a control unit for controlling the electronic devices; a first power source for supplying a power source to the electronic devices; a first power source line connected between the electronic unit and the control unit, the first power source line being provided for supplying the first power source; and a signal line connected between the electronic unit and the control unit; a second power source provided separate from the first power source for supplying the power source to the electronic devices; and a second power source line connected between the second power source and the electronic units, the second power source line being provided for supplying the second power source, and the second power source line not being connected to the control unit.

The invention according to a second aspect is the vehicle-mounted system according to the first aspect, wherein the first power source line and the second power source line are connected to the electronic units in a state where the first power source line and the second power source line are individually connected to diodes, and terminals of the respective diodes on the other side are connected to each other.

The invention according to a third aspect is the vehicle-mounted system according to the second aspect, further including a connection connector mounted on the first power source line, the signal line and the second power source line, and provided for connecting the first power source line, the signal line and the second power source line to the electronic unit, wherein the diode is incorporated in the connection connector.

The invention according to a fourth aspect is a wire harness structural body including: a first power source line connected between an electronic unit formed of one or more electronic devices disposed on a vehicle and a control unit for controlling the electronic devices, the first power source line being provided for supplying a power source from a first power source; a signal line connected between the electronic unit and the control unit; a second power source line connected between a second power source separate from the first power source and the electronic unit, the second power source line being provided for supplying the second power source, and the second power source line not being connected to the control unit.

Advantageous Effects of Invention

As has been described heretofore, according to the inventions described in the first to the fourth aspects, even when a power source cannot be supplied through the first power source line because of the occurrence of an abnormality in the first power source line, a power source can be supplied to the electronic unit through the second power source line and hence, the electronic devices can be driven even when an abnormality occurs in the first power source line.

According to the invention described in the second aspect, a reverse flow of a power source to the first power source line and the second power source line can be prevented by the diodes.

According to the invention described in the third aspect, since the diode is incorporated in the connection connector, the diode can be easily connected.

DESCRIPTION OF EMBODIMENTS

Figure 1:
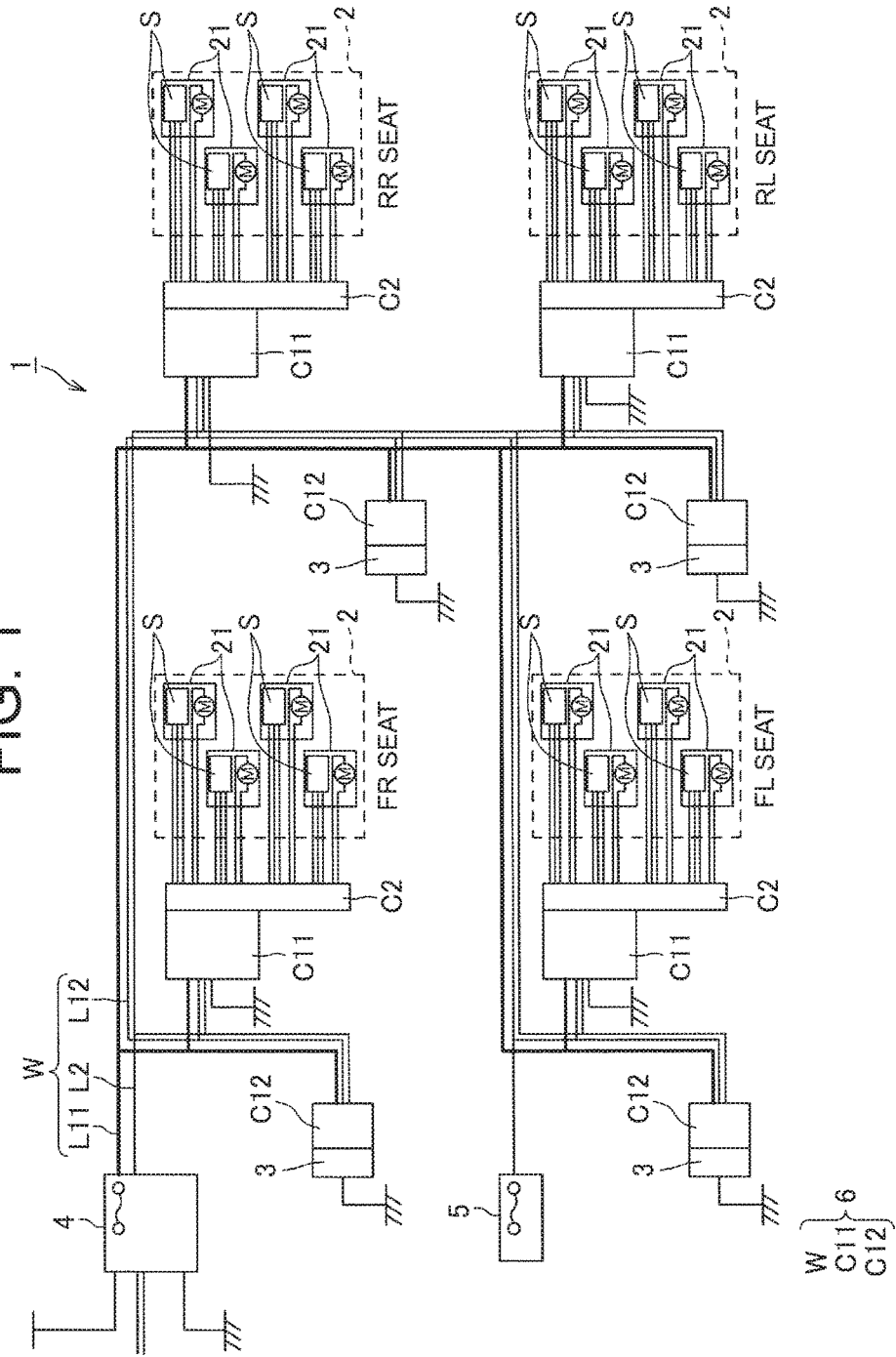
FIG. 1 is a circuit diagram showing one embodiment of a seat control system which forms a vehicle-mounted system of the present invention.
Figure 2:
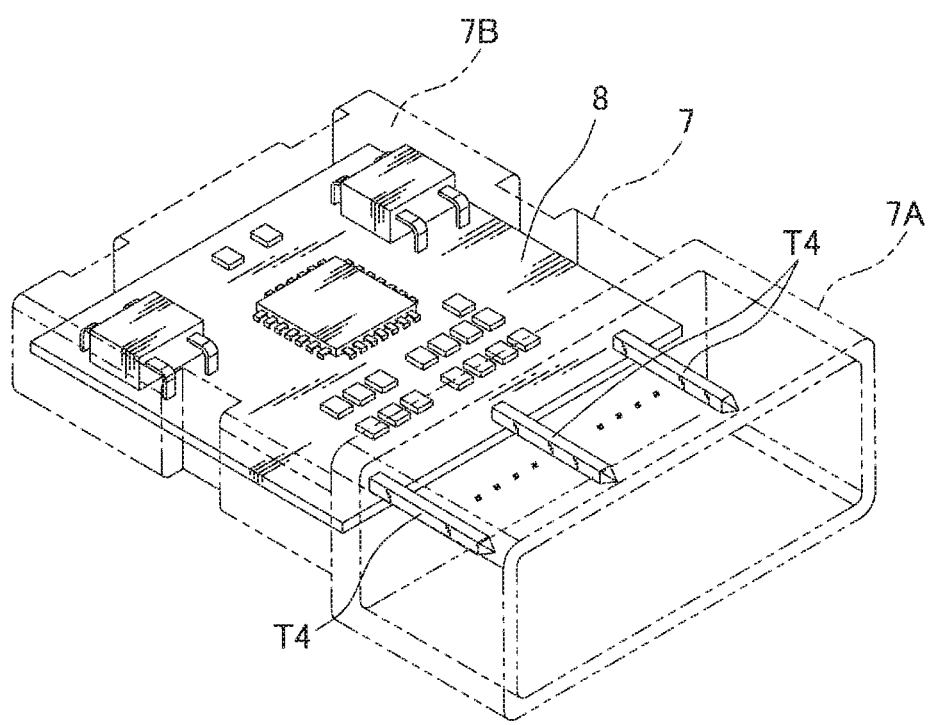
FIG. 2 is a perspective view of a drive connector and a signal connector shown in FIG. 1.

Hereinafter, a seat control system which forms a vehicle-mounted system which incorporates a wire harness structural body of the present invention therein is described hereinafter with reference to FIG. 1 to FIG. 3. As shown in the drawings, a seat control system 1 includes: a plurality of motor units 2 (=electronic units) which are disposed on a front right (FR) seat, a front left (FL) seat, a rear right (RR) seat and a rear left (RL) seat of a vehicle respectively; switch units 3 (=electronic units) which are operation units for the motor units 2; a power source box 4 which forms a first power source; a power source box 5 which forms a second power source, and a wire harness structural body 6 for connecting the plurality of motor units 2, the switch units 3 and the power source boxes 4, 5 to each other.

The motor units 2 are respectively formed of a plurality of motors 21 (electronic devices) which form electronic devices for adjusting positions of the FR seat, the FL seat, the RR seat, or the RL seat in the longitudinal direction, the inclination of back rest of the seat and the like, and the motor units 2 are mounted on the FR seat, the FL seat, the RR seat, and the RL seat respectively. Each motor 21 is formed of: a motor body M which drives each seat, and a sensor S which outputs a sensor signal corresponding to a displacement amount of the seat when the motor body M is driven.

The switch units 3 are respectively disposed on the FR seat, the FL seat, the RR seat, and the RL seat. The switch unit 3 is formed of a plurality of switches (=electronic devices) which each user seated on the FR seat, the FL seat, the RR seat, or the RL seat operates for adjusting the position of the seat in the longitudinal direction, the inclination of the back rest of the seat and the like.

The power source box 4 includes: a distribution circuit to which a vehicle-mounted battery (not shown in the drawing) is connected and which distributes a power source from the vehicle-mounted battery; and a control ECU which forms a control unit for controlling the motor units 2 (both not shown in the drawing). The control ECU is formed of a microcomputer which controls the entire seat control system 1, and is operated upon reception of the supply of power source distributed by the distribution circuit. The control ECU includes an external connector (not shown in the drawing) connected to the wire harness structural body 6 described later.

To the above-mentioned power source box 5, a power source separate from a power source supplied to the power source box 4 from a vehicle-mounted battery is supplied. A power source supplied from the power source box 5 is a low power source capable of driving only one out of a plurality of motor units 2, and is lower than a power source supplied from the power source box 4. The wire harness structural body 6 is formed of a wire harness W, and drive connectors C11 and signal connectors C12 (=connection connectors) which are respectively mounted on terminals of the wire harness W.

The wire harness W is formed of: a main power source line L11 which forms a first power source line connected between the control ECU and the plurality of units 2, 3 and is provided for supplying a power source from the power source box 4; a signal line L2 which is connected between the control ECU and the plurality of units 2, 3; and a redundant power source line L12 which is connected between the power source box 5 and the plurality of units 2, 3 and forms a second power source line for supplying a power source from the power source box 5.

The above-mentioned main power source line L11 and the signal line L2 are pulled out from the power source box 4 (control ECU), and are respectively branched toward the respective units 2, 3. The redundant power source line L12 is pulled out from the power source box 5, and is branched toward the respective units 2, 3. The drive connectors C11 and the signal connectors C12 are respectively mounted on terminals of the branched main power source lines L11, the branched signal lines L2, and the branched redundant power source lines L12 which are respectively connected to the respective units 2, 3. The drive connector C11 is a connector connected to a unit-side connector C2 connected to the motor unit 2. The signal connector C12 is a connector connected to the switch unit 3.

In the wire harness structural body 6 having the above-mentioned configuration, a power source supply line for the units 2, 3 is formed of lines of two systems, that is, the main power source line L11 and the redundant power source line L12. The redundant power source line L12 is not connected to the control ECU, and a power source is not supplied to the control ECU through the redundant power source line L12. The control ECU, the drive connectors C11, and the signal connectors C12 are communicable with each other through the signal line L2.

Next, the configurations of the above-mentioned drive connector C11 and signal connector C12 are described with reference to FIG. 2. As shown in the drawing, the connectors C11 and C12 are respectively formed of: an outer housing 7 indicated by a dotted line; a main power source terminal fitting T11, a redundant power source terminal fitting T12, and a signal terminal fitting T2 (FIG. 3) which are connected to the wire harness W, a terminal fitting T4 which is connected to the units 2, 3; and an electronic printed circuit board 8 which is housed in the inside of the outer housing 7.

The outer housing 7 is formed into a flat cylindrical shape using an insulating synthetic resin, and includes a hood portion 7A and a board housing chamber 7B which is contiguously formed with the hood portion 7A and in which the electronic printed circuit board 8 is housed as integral parts thereof. The above-mentioned main power source terminal fitting T11, redundant power source terminal fitting T12 and signal terminal fitting T2 are respectively formed of a well-known crimp terminal or the like, and are respectively electrically connected to the main power source line L11, the redundant power source line L12, and the signal line L2 which form the wire harness W. Further, the terminal fittings T11, T12 and T2 are connected to the electronic printed circuit board 8.

One end of the terminal fitting T4 is connected to the electronic printed circuit board 8, and the other end of the terminal fitting T4 is connected to the inside of the hood portion 7A. When the above-mentioned connectors C11, C12 are respectively connected to the units 2, 3 by connector connection, power source is supplied to the respective units 2, 3 through the terminal fittings T4 and, at the same time, various signals are inputted to and outputted from the respective units 2, 3.

Figure 3A:
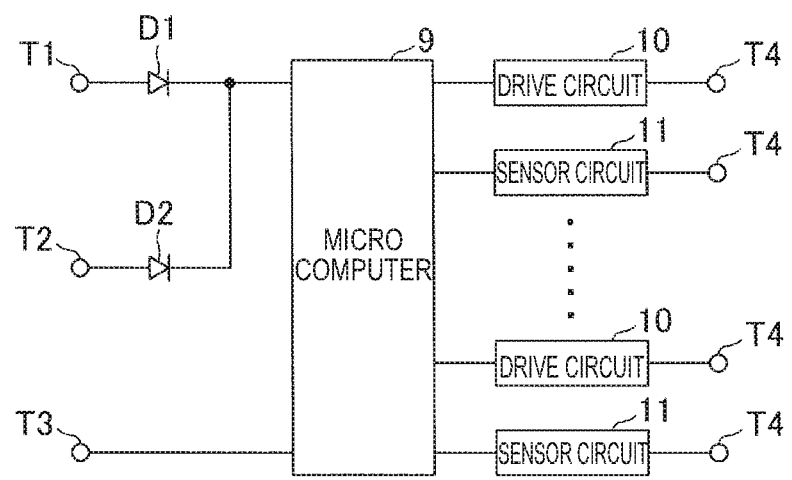
FIG. 3A is an electric constitutional view of the drive connector shown in FIG. 1.

As shown in FIG. 3A, a diode D1 which is connected to the main power source line L11 by means of the main power source terminal fitting T11, a diode D2 which is connected to the redundant power source line L12 by means of the redundant power source terminal fitting T12, a microcomputer (hereinafter referred to as microcomputer) 9, drive circuits 10 for driving the motor bodies M, and sensor circuits 11 which obtains a displacement amount of the seat upon receiving a sensor signal from the sensors S are mounted on the electronic printed circuit board 8 of the above-mentioned drive connector C11 respectively.

The diodes D1 and D2 are connected to the microcomputer 9 in a state where the other terminals of the diodes D1 and D2 are connected to each other so that a power source is supplied to the microcomputer 9 in such a state. Although not shown in the drawing, the diodes D1 and D2 supply a power source to the drive circuit 10 in a state where the other ends of the diodes D1 and D2 are connected to each other so that a power source is supplied to the motor unit 2 through the drive circuit 10.

The microcomputer 9 is electrically connected to the above-mentioned signal terminal fittings T2 so that the microcomputer 9 is communicably connected with the control ECU in the power source box 4 through the signal line L2. The microcomputer 9 is connected to the drive circuit 10, and drives the motor body M by controlling the drive circuit 10 in accordance with a control signal transmitted from the control ECU. The microcomputer 9 is also connected to the sensor circuit 11, and transmits a displacement amount of the seat obtained by the sensor circuit 11 to the control ECU.

Figure 3B:
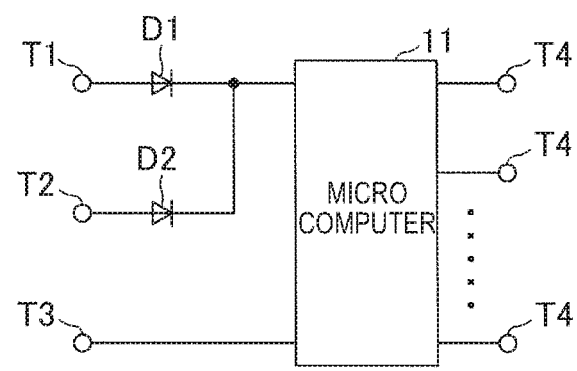
FIG. 3B is an electric constitutional view of the signal connector shown in FIG. 1.

As shown in FIG. 3B, the diode D1 which is connected to the main power source line L11 by means of the main power source terminal fitting T11, a diode D2 which is connected to the redundant power source line L12 by means of the redundant power source terminal fitting T12, and a microcomputer 12 are mounted on the electronic printed circuit board 8 of the signal connector C12 respectively.

The diodes D1 and D2 are connected to the microcomputer 12 in a state where the other terminals of the diodes D1 and D2 are connected to each other so that a power source is supplied to the microcomputer 12. Although not shown in the drawing, the diodes D1 and D2 are connected to the switch unit 3 through the terminal fitting T4 in a state where the other ends of the diodes D1 and D2 are connected to each other thus supplying a power source to the switch unit 3.

The microcomputer 12 is electrically connected to the signal terminal fitting T2, and is communicably connected with the control ECU in the power source box 4 through the signal line L2. Further, the microcomputer 12 is connected to the terminal fittings T4 thus being connected to a switch of the switch unit 3 so that the microcomputer 12 can detect a state of the switch. A microcomputer 12 outputs an operation signal indicative of a detected state of the switch to the control ECU.

Further, in this embodiment, a main power source switch for turning on and off the supply of a power source to the main power source line L11, and an abnormality detecting part for detecting an abnormality of the main power source line L11 are disposed in the power source box 4 (both not shown in the drawing). Turning on and off of the main power source switch is controlled by the control ECU. The abnormality detecting part is formed of a current sensor for detecting a current which flows through the main power source line L11, for example, and the control ECU detects an abnormality based on the current detected by the current sensor. Further, a redundant switch for turning on and off the supply of power source to the redundant power source line L12 is disposed in the power source box 5. The turning on and off of the redundant switch is controlled by the control ECU disposed in the power source box 4.

Next, the manner of operation of the seat control system 1 having the above-mentioned configuration is described. Firstly, the control ECU turns on the main power source switch and turns off the redundant switch in response to an operation of an ignition switch thus supplying a power source to the connectors C11, C12 and the units 2, 3 only through the main power source line L11. Then, with respect to the operation of the control ECU, when the switch which forms the switch unit 3 is operated by a user, the microcomputer 12 of the signal connector C12 connected to the operated switch detects such an operation, and transmits an operation signal to which an ID of the operated switch is added to the control ECU.

The control ECU can determine which switch of which seat is operated from the ID added to the operation signal, and outputs a drive command to the motor unit 2 of the seat which corresponds to the operated switch. When the drive connector C11 receives a drive command to be transmitted to the motor unit 2 connected to the drive connector C11 itself, the drive connector C11 drives the motor unit 2 which is a destination of the drive command by controlling the drive circuit 10. In this operation, the drive connector C11 may transmit a displacement amount of the seat obtained by the sensor circuit 11 to the control ECU, and the control ECU may transmit a drive command such that the seat assumes a seat position preliminarily set based on the displacement amount of the seat.

The control ECU transmits a drive command and, thereafter, determines whether or not an abnormality has occurred in the main power source line L11 based on a current which flows through the main power source line L11 detected by the abnormality detecting part. When a drive current corresponding to the drive command does not flow through the main power source line L11, the control ECU detects that an abnormality such as a disconnection has occurred in the main power source line L11, and turns off the main power source switch and turns on the redundant switch thus interrupting the supply of power source from the main power source line L11 and effectuating the supply of power source to the connectors C11, C12 and the units 2, 3 from the redundant power source line L12.

The supply of a power source from the redundant power source line L12 can drive only one motor unit 2 out of the plurality of motor units 2. Accordingly, after the supply of power source is switched from the main power source line L11 to the redundant power source line L12, the control ECU controls the drive connector C11 such that the motor units 2 disposed on the plurality of seats respectively are not driven simultaneously.

To be more specific, priority is assigned in advance to the FR seat, the RL seat, the RR seat and the RL seat. When the control ECU determines that the switch units 3 respectively disposed on the FR seat, the RL seat, the RR seat, and the RL seat are operated simultaneously based on operation signals from the signal connectors C12, the control ECU transmits a drive command only to the seat having a higher priority by comparing the operation signals respectively transmitted from the signal connectors C12.

With such an operation, although a user seated on the seat having a higher priority can drive own seat by operating the switch unit 3, a user seated on the seat having lower priority cannot drive own seat even by operating the switch unit 3. In this case, the seat control system may inform a user that the driving of the seat is restricted by using an alarm sound, a meter or an information terminal such as a navigation system. Further, the seat control system may centrally control the motor units 2 disposed corresponding to all seats by operating a switch unit (not shown in the drawing) disposed on a driver's seat.

According to the above-mentioned embodiment, by providing the redundant power source line L12, even when a power source cannot be supplied through the main power source line L11 because of the occurrence of an abnormality in the main power source line L11, a power source can be supplied to the units 2, 3 through the redundant power source line L12 and hence, the motors 21, the switches or the like can be driven even when an abnormality occurs in the main power source line L11.

According to the above-mentioned embodiment, the main power source line L11 and the redundant power source line L12 are individually connected to the diodes D1, D2 and are connected to the units 2, 3 respectively in a state where the other terminals of the diodes D1, D2 are connected to each other. A reverse flow of a power source to the main power source line L11 and to the redundant power source line L12 can be prevented by the diodes D1, D2.

According to the above-mentioned embodiment, the diodes D1, D2 are incorporated in the connectors C11, C12 which are mounted on the main power source line L11, the signal line L2, and the redundant power source line L12 for connecting the main power source line L11, the signal line L2 and the redundant power source line L12 to the units 2, 3 and hence, the diodes D1, D2 can be easily connected to the respective lines.

In the above-mentioned embodiment, a power source which the redundant power source line L12 can supply is set lower than a power source which the main power source line L11 can supply. However, the present invention is not limited to such a configuration, and these power source lines may be configured to supply power sources substantially at the same level. For example, in both the case where a power source is supplied through a main power source line L11 using a power source with which even the main power source line L11 can supply only a power source corresponding to one seat and the case where a power source is supplied using the redundant power source line L12, the control ECU may be configured to control the drive connector C11 such that the motor units 2 disposed on the plurality of seats respectively are not driven simultaneously.

In the above-mentioned embodiment, when the switch units 3 are operated simultaneously at two or more seats, only the motor unit 2 corresponding to the seat having a higher priority is driven. However, the present invention is not limited to such a configuration. For example, the seat control system may be configured to assign priority to a first switch unit operated out of the switch units 3 disposed on the respective seats.

According to the above-mentioned embodiment, the seat control system 1 of the present invention is described with respect to an example where the drive connector C11 and the signal connector C12 are disposed on respective seats. However, the seat control system 1 of the present invention is not limited to such a configuration. The drive connector C11 and the signal connector C12 may be disposed on only one seat.

According to the above-mentioned embodiment, the drive connector C11 and the signal connector C12 are provided as members separate from each other. However, the present invention is not limited to such a configuration. The drive connector C11 may be configured to function as a signal connector by connecting the switch unit 3 to the drive connector C11.

In the above-mentioned embodiment, the motors 21 and the switches are used as electronic devices. However, the electronic devices are not limited to the motors 21 and the switches. The electronic devices may be heaters or lighting devices disposed on the respective seats.

In the above-mentioned embodiment, the units 2, 3 are respectively formed of the plurality of electronic devices (motors 21 and the switches). However, the present invention is not limited to such a configuration. The units 2, 3 may be respectively formed of one or more electronic devices.

Further, the above-mentioned embodiment merely shows the representative configuration of the present invention, and the present invention is not limited to the above-mentioned embodiment. That is, various modifications can be carried out without departing from the gist of the present invention.

REFERENCE SIGNS LIST

1: seat control system (vehicle-mounted system)
2: motor unit (electronic unit)
3: switch unit (electronic unit)
4: power source box (first power source)
5: power source box (second power source)
6: wire harness structural body
21: motor (electronic device)
C11: drive connector (connection connector)
C12: signal connector (connection connector)
L11: main power source line (first power source line)
L12: redundant power source line (second power source line)
L2: signal line

The invention claimed is:

1. A vehicle-mounted system comprising:
   an electronic unit formed of one or more electronic devices mounted on a vehicle;
   a control unit for controlling the electronic devices;
   a first power source configured to supply power to all the electronic devices;
   a first power source line connected between the electronic unit and the control unit, the first power source line being provided for supplying the first power source to all the electronic devices constituting the electronic unit;
   a signal line connected between the electronic unit and the control unit;
   a second power source provided separate from the first power source and configured to supply power to the same electronic devices as the first power source supplies power and as the control unit controls; and
   a second power source line connected between the second power source and the electronic unit, the second power source line being provided for supplying the second power source to all the electronic devices constituting the electronic unit, and the second power source line not being connected to the control unit.

2. The vehicle-mounted system according to claim 1, wherein the first power source line and the second power source line are connected to the electronic units in a state where the first power source line and the second power source line are individually connected to diodes, and terminals of the respective diodes on the other side are connected to each other.

3. The vehicle-mounted system according to claim 2, further comprising a connection connector mounted on the first power source line, the signal line and the second power source line, and provided for connecting the first power source line, the signal line and the second power source line to the electronic unit, wherein
   the diode is incorporated in the connection connector.

4. A wire harness comprising:
   a first power source line connected between an electronic unit formed of one or more electronic devices disposed on a vehicle and a control unit for controlling the electronic devices, the first power source line being provided for supplying power from a first power source to all the electronic devices constituting the electronic unit;
   a signal line connected between the electronic unit and the control unit;
   a second power source line connected between a second power source provided separate from the first power source and the electronic unit, the second power source line being provided for supplying power from the second power source to all the electronic devices constituting the electronic unit, and the second power source line not being connected to the control unit.

* * * * *